United States Patent [19]
Burcham et al.

[11] Patent Number: 5,411,086
[45] Date of Patent: May 2, 1995

[54] OIL RECOVERY BY ENHANCED IMBITITION IN LOW PERMEABILITY RESERVOIRS

[75] Inventors: Christopher Burcham, Princeton, N.J.; Robert E. Fast, Bakersfield, Calif.; Anthony S. Murer, Bakersfield; Paul S. Northrop, Bakersfield, Calif.

[73] Assignee: Mobil Oil Corporation, Fairfax, Va.

[21] Appl. No.: 164,269

[22] Filed: Dec. 9, 1993

[51] Int. Cl.⁶ .................... E21B 43/24; E21B 43/267; E21B 43/30

[52] U.S. Cl. .................................. 166/245; 166/263; 166/270; 166/271; 166/272; 166/303; 166/308

[58] Field of Search ............... 166/245, 263, 266, 267, 166/270, 271, 272, 303, 305.1, 308

[56] References Cited

U.S. PATENT DOCUMENTS

| | | |
|---|---|---|
| 4,167,470 | 9/1979 | Karnofsky . |
| 4,374,023 | 2/1983 | Davis . |
| 4,485,871 | 12/1984 | Davis .................................. 166/266 |
| 4,635,720 | 1/1987 | Chew .............................. 166/263 X |
| 4,828,031 | 5/1989 | Davis .................................. 166/272 |
| 4,892,147 | 1/1990 | Jennings, Jr. et al. .............. 166/280 |
| 5,085,276 | 2/1992 | Rivas et al. ......................... 166/303 |
| 5,305,829 | 4/1994 | Kumar .................................. 166/245 |

Primary Examiner—George A. Suchfield
Attorney, Agent, or Firm—Alexander J. McKillop; George W. Hager, Jr.; Charles A. Malone

[57] ABSTRACT

A method for enhanced oil recovery from a low permeability diatomaceous reservoir by imbibition is described. In this method, oil is displaced from a single injection well, or series of injection wells into a single producer or series of producing wells by a combination of applied fluid pressure, plus "enhanced imbibition." Enhanced imbibition is accomplished by adding chemical additives to the injection fluid so that rock in the tight reservoir has a stronger affinity for the water present therein, thus releasing oil from the rock.

31 Claims, 1 Drawing Sheet

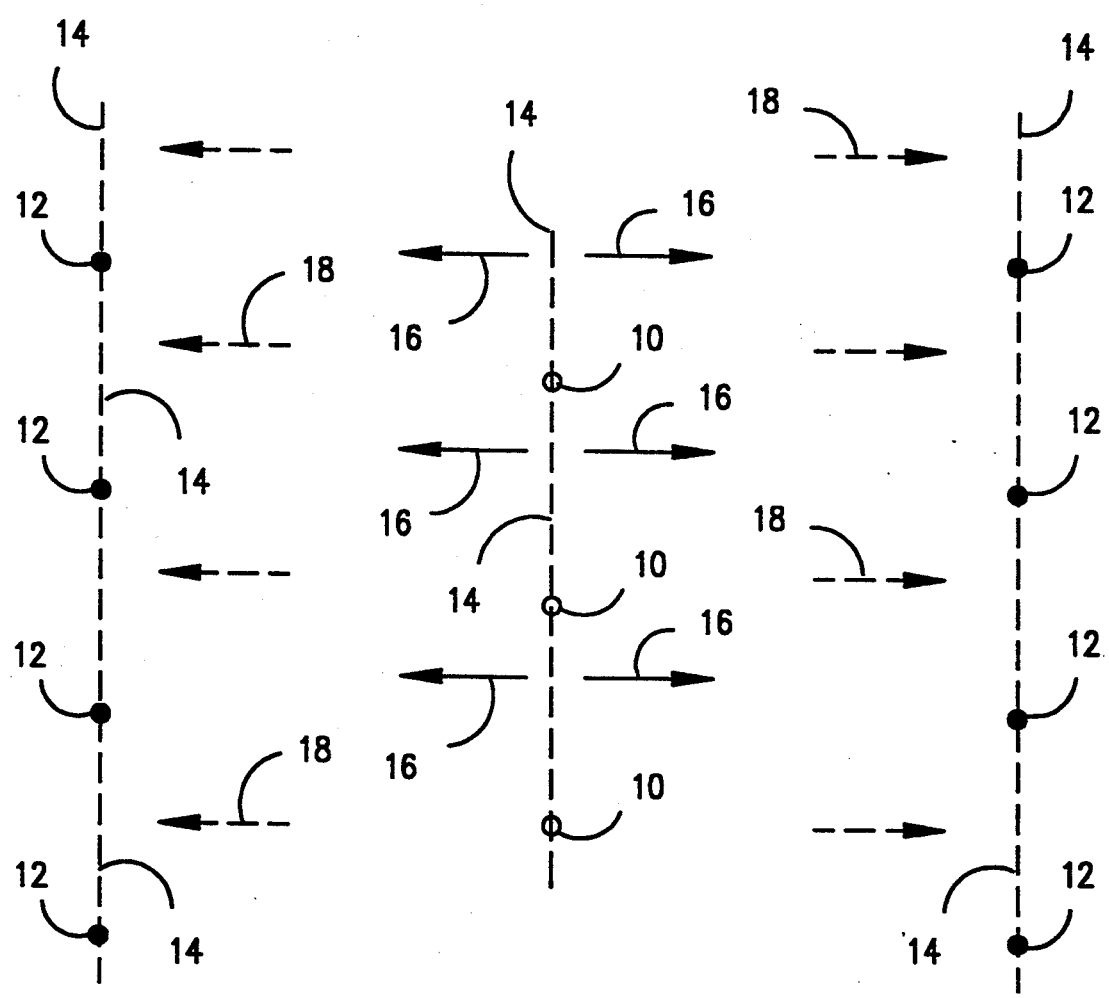

OIL RECOVERY BY ENHANCED IMBITITION IN LOW PERMEABILITY RESERVOIRS

FIELD OF THE INVENTION

The present invention relates to recovery of crude oil. In particular, the present invention provides an improved method for recovering hydrocarbons from diatomaceous formations.

BACKGROUND OF THE INVENTION

Hydrocarbon bearing diatomaceous formations are unique because they have high porosity, but have little permeability, i.e., they may contain significant amounts of oil but have very small flow channels or limited fractures through which oil could flow and, ultimately, be recovered. The unique properties of this type of formation arise because of its composition. The formation is composed largely of skeletal remains of diatoms. These skeletons are small. Also, their fragments are hollow and fluids may flow through natural micropores. They may also flow through fractures and openings between the diatom frustules.

Oil recovery from diatomaceous formations is usually quite limited because a significant portion of oil saturation may be bypassed using conventional recovery techniques such as primary, waterflooding, cyclic steam, or steam drive. Significant improvement of oil recovery would require that a method of displacing oil from the interior of the diatoms into the flow channels between the diatoms be provided. Furthermore, an additional benefit would be derived from improving permeability in the natural flow channels so that the oil can be recovered more rapidly and with a higher sweep efficiency.

Various methods have been proposed for increasing crude oil production from diatomaceous formations. For Example, U.S. Pat. No. 4,485,871 teaches a method of recovering hydrocarbons from diatomite in which an alcohol is injected into the formation followed by an aqueous alkaline solution. However, it has been found that certain formations do not respond to this type of stimulation. In particular, oil recovery using this method is not optimum in formations which are deeply buried and have not been extensively exposed to the atmosphere or oxygen bearing formation water. The interfacial tension and oil/rock wettability in these deeply buried formations must be modified in order to enhance oil recovery. A related method is described in U.S. Pat. No. 4,374,023.

U.S. Pat. No. 4,167,470 teaches an alternative method of recovering oil from diatomaceous formations in which a hydrocarbon solvent is contacted with mined diatomaceous ore in a 6 stage extraction process. Solvent is then recovered in a steam stripping apparatus. There are several problems in utilizing this process in a cost effective manner. For example, the ore must be mined, with the attendant environmental and economic considerations. Furthermore, the process is extremely complex and capital intensive. The process is an extraction process and discloses no provision for adding, for example, a chelating agent, and it is not a two-phase process such as is disclosed herein.

British Pat. No. 1,559,948 (Buckley) teaches a method of recovering heavy oil from tar sand (which is sometimes incorrectly attributed to being equivalent to diatomite), in which a steam distillable solvent and an oil soluble surfactant are simultaneously injected. The solvent is variously described as being, for example, kerosene or naphtha. The surfactants are described as being in one of two classes, i.e., thermally labile or steam distillable. An oil soluble surfactant such as thermally labile surfactants are suggested as being alkylaryl sulphonates or alkaryl naphthenic sulphonates. Examples of such steam distillable surfactants are suggested as being alkyl and other amines. Again, this is an extraction process and does not suggest a more preferred two-phase process.

Davis in U.S. Pat. No. 4,828,031 that issued on May 9, 1989 discloses a method for recovering oil from a diatomaceous formation. A solvent is injected into the diatomaceous formation followed by an aqueous surface active solution. The aqueous surface active solution contains a diatomite/oil water wettability improving agent and an oil/water surface tension lowering agent. The method may be supplemented by injection of water and/or steam into the diatomite. Injection pressure into the formation was held to just below the value where a long fracture may be induced.

Therefore, what is needed is a method that enhances an imbibition process to increase the rate of water uptake by a diatomaceous reservoir where a series of wells are utilized along with hydraulic fracturing.

SUMMARY OF THE INVENTION

This invention is directed to a method for recovering oil from a low permeability diatomaceous reservoir. In the practice of this invention a well or wells are drilled and completed in the diatomaceous reservoir so as to correspond with the fracture trend or orientation. The wells are then hydraulically fractured and propped so that the fractures formed by in line injection or producer wells communicate or "touch" each other. In one embodiment of the invention a single injection well and a single producer well are utilized and fractured.

In another embodiment of this invention multiple injection wells and producer wells are used so as to form a line drive configuration. In this configuration, injector wells are placed in line adjacent to one another so as to have fluid communication with fractures therein. Production wells are spaced in line on each side of and preferably parallel to the injection wells. These production wells are also fractured in a manner so as to establish fluid communication with each other via the fractures.

Once the wells have been fractured and propped, chemical additives are mixed into saturated steam, water or brine and pumped into the injection wells. Alternatively, in lieu of propping the fracture with proppant, the aqueous mixture containing the chemical additives can be injected into the formation at a rate and pressure exceeding the formation fracture pressure. The water or brine may be either hot (vapor or liquid phase) or cold. The chemical additives utilized comprise wetting agents, and/or surfactants, and/or a caustic or alkali metal hydroxide such as sodium hydroxide. The mixture is pumped into the injector wells and the mixture will flow perpendicular to the fractures toward the production well or wells. As the additives flow through the diatomaceous matrix of the reservoir, they are imbibed onto the matrix mineral surfaces at the fracture faces. Imbibition of this mixture on the fracture faces (natural and induced) and within the rock matrix causes oil and water to flow from the matrix into larger open pore spaces or fractures.

Oil and water flow into the fractures communicating with the producer well where they are subsequently lifted out of the reservoir. Once the oil/water mixture has been removed from the producer or producer wells, oil and water are separated at the surface. The separated and recovered water can then be reinjected along with any chemical additives required to obtain a desired additive concentration. When hot water or hot brine is used, the imbibition process is further enhanced by increasing the matrix wettability (i.e., capillary pressure) with an attendant decrease in oil viscosity.

It is therefore an object of this invention to use chemical additives to increase the wettability of the formation matrix so as to obtain increased oil recovery from a fractured (naturally or hydraulically induced) formation.

It is another object of this invention to increase the distance from the wellbore that the injectant travels so as to contact additional oil in a diatomaceous formation or reservoir.

It is a further object of this invention to use a larger well spacing so as to obtain increased oil production via a fractured reservoir or formation with fewer wells.

It is a yet further object of this invention to use injection into a directional wellbore so as to intersect distantly removed fracture systems in a production wellbore.

BRIEF DESCRIPTION OF THE DRAWING

The drawing is a plan view of a multiple aligned well configuration where both aligned injector and aligned producer wells are utilized in an enhanced imbibition process.

DESCRIPTION OF THE PREFERRED EMBODIMENTS

In the practice of this invention, referring to the drawing, a series of vertical wells is drilled and completed on the fracture trend or orientation in the diatomaceous formation or reservoir. Once the wells have been drilled, they are hydraulically fractured and propped so that the fractures communicate or "touch" each other. As is shown in the drawing, a series of injection wells is loosely spaced apart from each other and perforated so as to direct fluid 16 in the direction of a series of in line producer wells 12.

Both the injector and producer wells are fractured directionally through the perforations resulting in fractures that are formed parallel to each other. These fractures 14 are shown in the drawing. Once the wells have been completed and fractured as desired, a fluid, preferably water or brine, with desired chemical additives therein is directed into injector well or wells 10. The water or brine which is utilized may be at ambient temperature or it may be heated. A method for fracturing and propping fractures in a formation where refractory proppants are utilized is disclosed in U.S. Pat. No. 4,892,147 which issued to Jennings, Jr. et al. on Jan. 9, 1990. This patent is hereby incorporated by reference herein. As is preferred, the fractures, which are placed in both injector wells 10 and producer wells 12, are propped with a proppant so as to keep them from closing. However, the injector's fractures may also be kept open by injecting the fluid and additives continuously above the pressure and rate required to fracture the formation.

A combination of chemical additives is used to increase water wetness of a rock thereby increasing the capillary pressure which forces oil from the diatomaceous formation. These chemical additives include wetting agents (e.g. mono-, di-, tri- basic forms of sodium or potassium phosphate, and sodium silicate). Experiments have shown that these agents can be used in concentrations of about 0.5 to about 2 wt % to increase oil expulsion by imbibition up to 70% over that which would be obtainable by the use of brine alone. It is believed that these chemicals are effective because they increase the water wetness of the rock which increases the capillary pressure, thereby forcing the oil from the rock or diatomaceous matrix of the formation.

Another chemical additive which is used and mixed in with water or brine comprises surfactants. These surfactants can be either, sulfonates, ammonium salts of linear alcohol, ethoxy sulfates, or calcium phenol ethoxylated alkyl sulfonates. These surfactants lower the interfacial tension between oil and water thereby allowing oil to flow more freely through the diatomaceous matrix. Imbibition experiments with up to 3 wt % of active surfactant concentration indicates a 31% improvement in oil recovery over that obtainable with brine alone. The primary effect of the surfactant is believed to take place at the matrix/fracture interface, where it frees oil from the rock face. This effect is very significant in a field where fracture surfaces may be several thousand square feet.

These wettability agents and surfactants are discussed in U.S. Pat. No. 4,828,031 which issued to Davis on May 9, 1989. This patent is hereby incorporated by reference herein.

An alternative to using a surfactant is the use of sodium hydroxide which is placed into the water or brine. The sodium hydroxide or potassium hydroxide which is used forms a caustic that reacts with organic acids in oil to produce natural surfactants. These surfactants will act in a manner similar to purchased surfactants. Experiments indicate that a pH of around 12 will significantly increase oil recovery by imbibition. Caustic or alkaline flooding has been used in ordinary sandstone reservoirs with good results. Although silica dissolution is a concern at high pH's, tests of produced field waters from thermal operations have shown that silica dissolution is relatively minor.

Although an aligned well configuration is preferred as shown in the drawing, in another embodiment a single injection well that is hydraulically fractured can also be used in combination with one or more producing wells. Any or all of these wells can be hydraulically fractured.

Referring to the drawing, injectant fluid 16 is directed into injector well or wells 10 by a pressure sufficient to move the mixture containing the additive into the diatomaceous matrix formation. The mixture which is used may contain one or a combination of the chemical additives such as wetting agents, surfactants, and caustic or alkaline materials as above mentioned. These additives enhance imbibition of water into the matrix at the fracture faces and within the formation thereby causing oil and water to flow from the fracture faces so as to be displaced toward the producing well or wells. Oil and water will flow to the producer well or wells 12 and thereafter be produced to the surface. Once the oil and water are produced to the surface, the water is separated from the oil. The separated water is reinjected into the formation. The reinjected water is conditioned to obtain a desired chemical additive level so as to continue the imbibition process.

As will be understood by those skilled in the art, hot water or hot brine when used will enhance the imbibition process by further increasing matrix wettability. Increased matrix wettability increases the capillary pressure. The hot water or brine has the added effect of reducing the oil viscosity, thereby increasing the oil's mobility. This combination results in a decrease in the residual oil saturation and an increase in oil mobility. Some oil or hydrocarbonaceous fluids will be displaced by counter current imbibition into fractures communicating with the injection well or wells. For this reason it is preferred that the injector well or wells occasionally be placed on production to produce additional oil or hydrocarbonaceous fluids from the diatomaceous formation or reservoirs. Additionally, by using the injector well as a producer well a fracture or fractures communicating with the injector well or wells will be cleaned out.

Use of the chemical additives in combination with a fractured diatomaceous reservoir or formation will allow substantially more hydrocarbonaceous fluids or oil to be produced from the formation than heretofore possible. This occurs because the fractures in both the injector and producer wells allow substantially more formation contact by the mixture containing the chemical additives which removes more oil from the formation. Because the wells are more widely spaced, the hydraulic fractures communicate with the matrix over a greater area than would be obtainable by the use of an unfractured formation where a close well configuration or pattern is utilized.

In another embodiment, a single well is completed and perforated within a fractured formation which fractures may be hydraulically made or naturally occurring. An aqueous additive mixture is injected into the formation via said well. Injection is ceased and the mixture is allowed to remain there for a time sufficient to obtain enhanced imbibition. Thereafter, hydrocarbonaceous fluids are produced from the well. These steps are repeated until a desired amount of hydrocarbonaceous fluids are produced from the formation.

Obviously, many other variations and modifications of this invention as previously set forth may be made without departing from the spirit and scope of this invention and those skilled in the art readily understand. Such variations and modifications are considered part of this invention and within the purview and scope of the appended claims.

What is claimed:

1. A method for enhancing oil recovery from a low permeability diatomaceous reservoir or formation containing initially immoble hydrcarbons wherein enhanced imbibition is induced comprising;
   a) fracturing at least one injector and at least one producer well in a low permeability formation thereby creating at least one fracture;
   b) directing an aqueous mixture containing a chemical additive into the injector well where the additive is selected from a member of the group consisting of an alkali metal hydroxide, a surfactant, or a wetting agent that, either alone or in combination with organic acids in the formation's oil, is present in an amount effective to enhance imbibition by increasing the rate of water uptake from the low permeability formation and thereby increase oil flow therefrom; and
   c) continuing the injection of the aqueous mixture containing the chemical additive into the injector well for a time sufficient to cause oil to flow from the diatomaceous formation where it is subsequently produced to the surface via the producer well.

2. The method as recited in claim 1 where two or more injector and two or more producer wellbores are used.

3. The method as recited in claim 1 where the chemical additive comprises a surfactant or a wetting agent.

4. The method as recited in claim 1 where in step b) the alkali metal hydroxide comprises sodium or potassium hydroxide which produces a surfactant in the formation by the reaction of the alkali metal hydroxide solution with organic acids in the oil.

5. The method as recited in claim 1 where the fracture is propped.

6. The method as recited in claim 1 where the aqueous mixture comprises water or brine.

7. The method as recited in claim 1 where the aqueous mixture comprises saturated steam, hot water or hot brine.

8. The method as recited in claim 1 where the aqueous mixture comprises hot water or brine and a surfactant.

9. The method as recited in claim 1 where the aqueous mixture comprises saturated steam, hot water or brine and sodium hydroxide.

10. The method as recited in claim 1 where the first well is an injector well, the second well is a producer well and a line of injector wells and two lines of producer wells are on opposite sides of and parallel to said injector wells.

11. The method as recited in claim 1 where after step c) the aqueous mixture is injected into the injector well, aqueous mixture injection is ceased, and hydrocarbonaceous fluids are produced from the injector well.

12. A method for enhancing oil recovery from a low permeability diatomaceous reservoir or formation which is naturally or hydraulically fractured wherein enhanced imbibition is induced comprising;
    a) drilling and completing at least one first perforated well and at least one second spaced apart perforated well in the low permeability formation containing at least one fracture that fluidly communicates with each
    b) directing an aqueous mixture containing a chemical additive into the first well where the additive is selected from a member of the group consisting of an alkali metal hydroxide, a surfactant, or a wetting agent that, either alone or in combination with organic acids in the formation's oil, is present in an amount effective to enhance imbibition by increasing the rate of water uptake from the low permeability formation and thereby increase oil flow therefrom; and
    c) continuing the injection of the aqueous mixture containing the chemical additive into'the first well for a time sufficient to cause oil to flow from the diatomaceous formation where it is subsequently produced to the surface via the second well.

13. The method as recited in claim 12 where the first well is an injector well, the second well is a producer well and two or more injector and two or more producer wells are used.

14. The method as recited in claim 12 where the chemical additive comprises a surfactant or a wetting agent.

15. The method as recited in claim 12 where in step b) the alkali metal hydroxide comprises sodium or potassium hydroxide which produces a surfactant in the formation by the reaction of the alkali metal hydroxide solution with organic acids in the oil.

16. The method as recited in claim 12 where the fracture is propped.

17. The method as recited in claim 12 where the aqueous mixture comprises water or brine.

18. The method as recited in claim 12 where the aqueous mixture comprises saturated steam, hot water or hot brine.

19. The method as recited in claim 12 where the aqueous mixture comprises hot water or brine and a surfactant.

20. The method as recited in claim 12 where the aqueous mixture comprises saturated steam, hot water or brine and sodium hydroxide.

21. The method as recited in claim 12 where the first well is an injector well, the second well is a producer well and a line of injector wells and two lines of producer wells are on opposite sides of and parallel to said injector wells.

22. The method as recited in claim 12 where after step c) the aqueous mixture is injected into the first well, aqueous mixture injection is ceased, and hydrocarbonaceous fluids are produced from the first well.

23. A method for enhancing oil recovery from a low permeability diatomaceous reservoir or formation which is naturally or hydraulically fractured wherein enhanced imbibition is induced comprising;
   a) drilling and completing one perforated well in the low permeability formation which contains at least one fracture that fluidly communicates with said well;
   b) injecting an aqueous mixture containing a chemical additive into the formation via said well where said additive is selected from a member of the group consisting of an alkali metal hydroxide, a surfactant, or a wettability agent that, either alone or in combination with organic acids in the formation's oil, is present in an amount effective to enhance imbibition by increasing the rate of water uptake thereby causing an increase in oil flow from said low permeability formation;
   c) ceasing the injection of the aqueous mixture into said formation; and
   d) producing thereafter hydrocarbonaceous fluids from said well.

24. The method as recited in claim 23 where steps b), c), and d) are repeated until a desired amount of hydrocarbonaceous fluids have been produced from the formation.

25. The method as recited in claim 23 where the chemical additive comprises a surfactant or a wetting agent.

26. The method as recited in claim 23 where in step b) the chemical additive comprises an alkali metal hydroxide which produces a surfactant in the formation by the reaction of the alkali metal-hydroxide solution with organic acids in the oil.

27. The method as recited in claim 23 where the fracture is propped.

28. The method as recited in claim 23 where the aqueous mixture utilized comprises water or brine.

29. The method as recited in claim 23 where the aqueous mixture comprises saturated steam, hot water or hot brine.

30. The method as recited in claim 23 where the aqueous mixture comprises saturated steam, hot water or brine and sodium hydroxide.

31. The method as recited in claim 23 where the aqueous mixture comprises saturated steam, hot water or brine, a surfactant, and a wettabililty agent.

* * * * *